(12) United States Patent
Fenny et al.

(10) Patent No.: US 11,370,544 B2
(45) Date of Patent: Jun. 28, 2022

(54) TRANSLATING PAYLOAD BAY PALLET FOR AIRCRAFT

(71) Applicant: Bell Textron Inc., Fort Worth, TX (US)

(72) Inventors: Carlos A. Fenny, Fort Worth, TX (US); Brandon Anthony Magalhaes, Bedford, TX (US); Gary John Coleman, Jr., Fort Worth, TX (US)

(73) Assignee: Textron Innovations Inc, Fort Worth, TX (US)

( * ) Notice: Subject to any disclaimer, the term of this patent is extended or adjusted under 35 U.S.C. 154(b) by 186 days.

(21) Appl. No.: 16/891,947

(22) Filed: Jun. 3, 2020

(65) Prior Publication Data
US 2021/0380246 A1 Dec. 9, 2021

(51) Int. Cl.
*B64D 9/00* (2006.01)
*B64C 1/14* (2006.01)
*B64D 7/06* (2006.01)

(52) U.S. Cl.
CPC ............ *B64D 9/003* (2013.01); *B64C 1/1415* (2013.01); *B64D 7/06* (2013.01); *B64D 2009/006* (2013.01)

(58) Field of Classification Search
CPC ...... B64D 2009/006; B64D 1/06; B64D 1/04; B64D 7/06; B64D 9/003; B60P 1/44; B64C 1/22
USPC ...................................................... 296/26.09
See application file for complete search history.

(56) References Cited

U.S. PATENT DOCUMENTS

| | | | | |
|---|---|---|---|---|
| 2,409,210 | A | * | 10/1946 | Jolly .................. B64D 1/04 89/1.51 |
| 2,734,705 | A | * | 2/1956 | Robertson .............. B64D 1/04 89/1.51 |
| 2,975,676 | A | | 3/1961 | Butler |
| 3,463,334 | A | * | 8/1969 | Longmire ................ B64C 1/22 212/73 |
| 3,552,587 | A | * | 1/1971 | Warren .................... B66C 7/00 294/81.5 |
| 3,776,492 | A | | 12/1973 | Iben |
| 4,333,384 | A | | 6/1982 | Arnold |
| 4,378,098 | A | * | 3/1983 | Evans ..................... B64C 1/22 244/102 R |
| 4,681,013 | A | | 7/1987 | Farley et al. |
| 4,802,400 | A | | 2/1989 | Griffin et al. |
| 4,858,855 | A | * | 8/1989 | Dalbera ................... B64C 1/22 212/323 |
| 4,930,398 | A | | 6/1990 | Sharples |

(Continued)

OTHER PUBLICATIONS

USPTO Non-Final Office Action for U.S. Appl. No. 16/841,043 dated Dec. 2, 2021.

(Continued)

*Primary Examiner* — Christopher D Hutchens
(74) *Attorney, Agent, or Firm* — Patent Capital Group

(57) ABSTRACT

A system is described and includes a first track assembly for connecting a top surface of a pallet supporting payload to an upper interior surface of a payload bay of an aircraft; a second track assembly for connecting a side surface of the pallet to a side interior surface of the payload bay; and a pallet actuator system for selectively moving the pallet along the first and second track assemblies between a first position in which the pallet is fully extended from the payload bay and a second position in which the pallet is fully retracted into the payload bay.

20 Claims, 19 Drawing Sheets

(56) References Cited

U.S. PATENT DOCUMENTS

| | | | |
|---|---|---|---|
| 6,257,638 B1 * | 7/2001 | Graber | B60P 3/34 |
| | | | 296/26.08 |
| 6,536,711 B1 | 3/2003 | Conway, Jr. et al. | |
| 6,663,047 B1 | 12/2003 | Arata | |
| 2009/0314893 A1 | 12/2009 | Lugaro et al. | |
| 2018/0079482 A1 | 3/2018 | Ivans et al. | |

OTHER PUBLICATIONS

USPTO Non-Final Office Action for U.S. Appl. No. 16/841,007 dated Jun. 18, 2021.
USPTO Final Rejection for U.S. Appl. No. 16/841,043 dated Mar. 7, 2022, 7 pages.

* cited by examiner

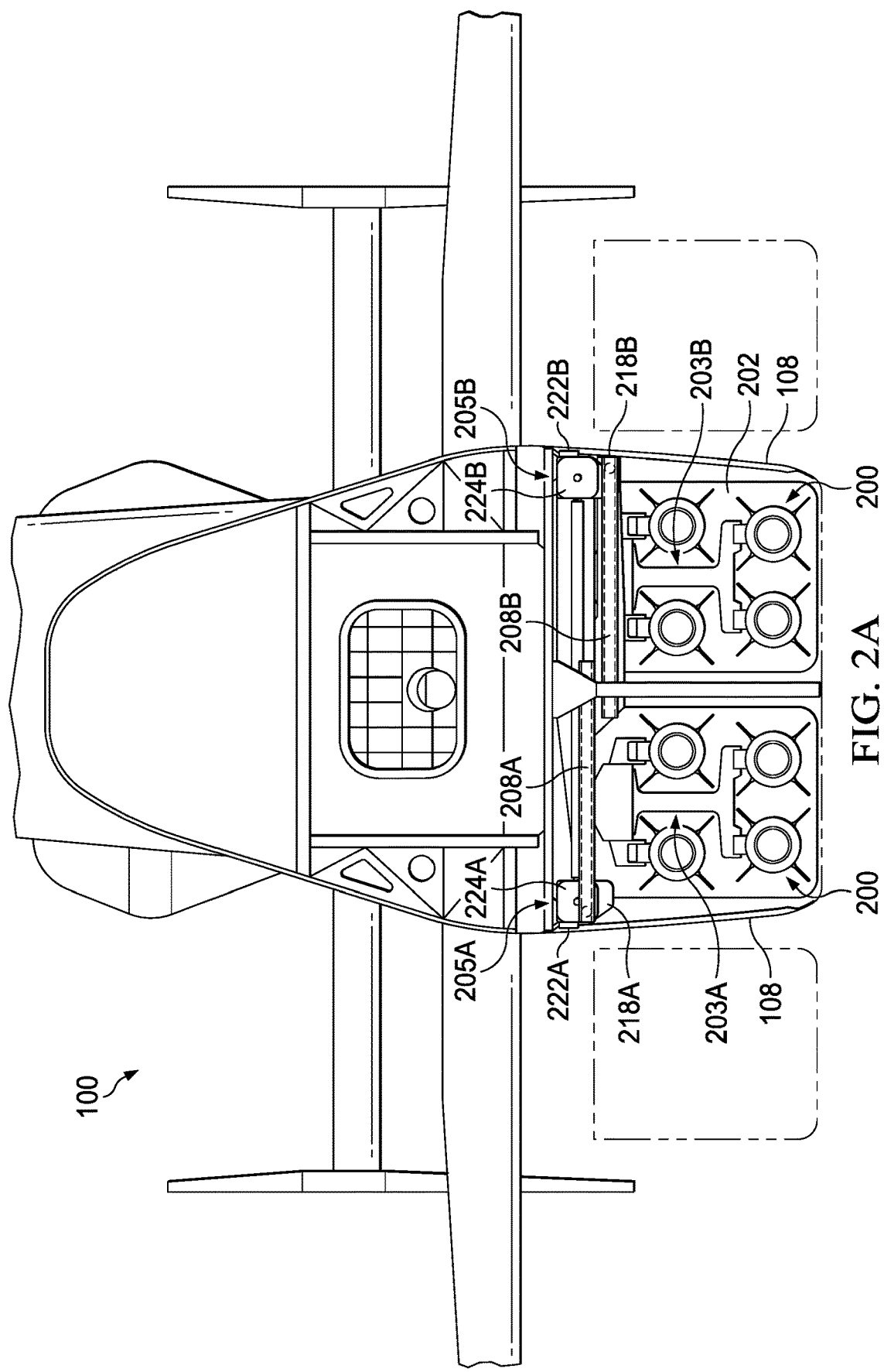

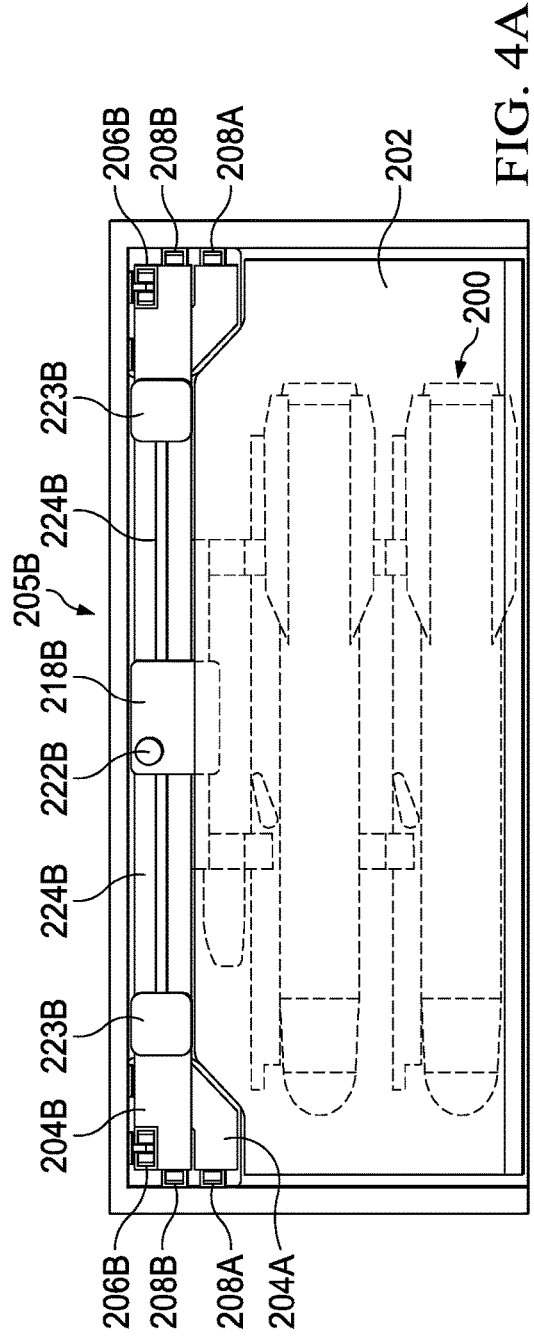
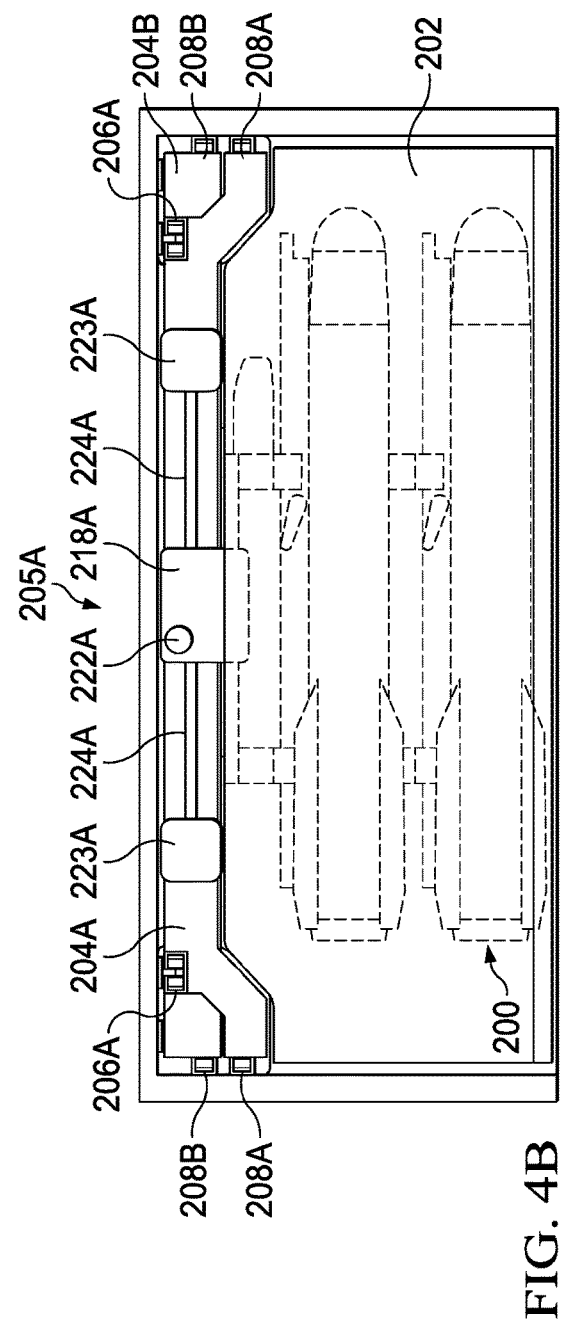
FIG. 4A
FIG. 4B

TRANSLATING PAYLOAD BAY PALLET FOR AIRCRAFT

TECHNICAL FIELD

This disclosure relates generally to aircraft devices and, more particularly, to a support structure and actuation mechanism for providing a translating payload bay pallet in such aircraft devices.

SUMMARY

One embodiment is a system comprising a first track assembly for connecting a top surface of a pallet supporting payload to an upper interior surface of a payload bay of an aircraft; a second track assembly for connecting a side surface of the pallet to a side interior surface of the payload bay; and a pallet actuator system for selectively moving the pallet along the first and second track assemblies between a first position in which the pallet is fully extended from the payload bay and a second position in which the pallet is fully retracted into the payload bay.

Another embodiment is an aircraft comprising a payload bay; a first pallet disposed on a first side of the payload bay; a second pallet disposed on a second side of the payload bay; a first top track assembly for connecting a top surface of the first pallet supporting payload to an upper interior surface of the payload bay; a second top rack assembly for connecting a top surface of the second pallet supporting payload to the upper interior surface of the payload bay; a first lower track assembly for connecting a side surface of the second pallet to a side interior surface of the payload bay; a second lower track assembly for connecting a side surface of the second pallet to the side interior surface of the payload bay; a first pallet actuator system for selectively moving the first pallet along the first track assemblies between an extended position of the first pallet and a retracted position of the first pallet; and a second pallet actuator system for selectively moving the second pallet along the second track assemblies between an extended position of the second pallet and a retracted position of the second pallet.

Yet another embodiment is a method comprising providing a first track assembly for connecting a top surface of a pallet supporting payload to an upper interior surface of a payload bay of an aircraft; providing a second track assembly for connecting a side surface of the pallet to a side interior surface of the payload bay; and selectively moving the pallet along the first and second track assemblies between a first position in which the pallet is fully extended from the payload bay and a second position in which the pallet is fully retracted into the payload bay using a linear actuator.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements:

FIG. 2A is a front cut-away view of a portion of the aircraft of FIG. 1 in which payload is retracted and stowed in the payload bay in accordance with features of one embodiment;

FIG. 4A is a left cut-away view of a portion of the aircraft of FIG. 1 in which payload is retracted and stowed in the payload bay in accordance with features of one embodiment;

FIG. 4B is a right cut-away view of a portion of the aircraft of FIG. 1 in which payload is extended from the payload bay in accordance with features of one embodiment;

DETAILED DESCRIPTION

Figure 1:
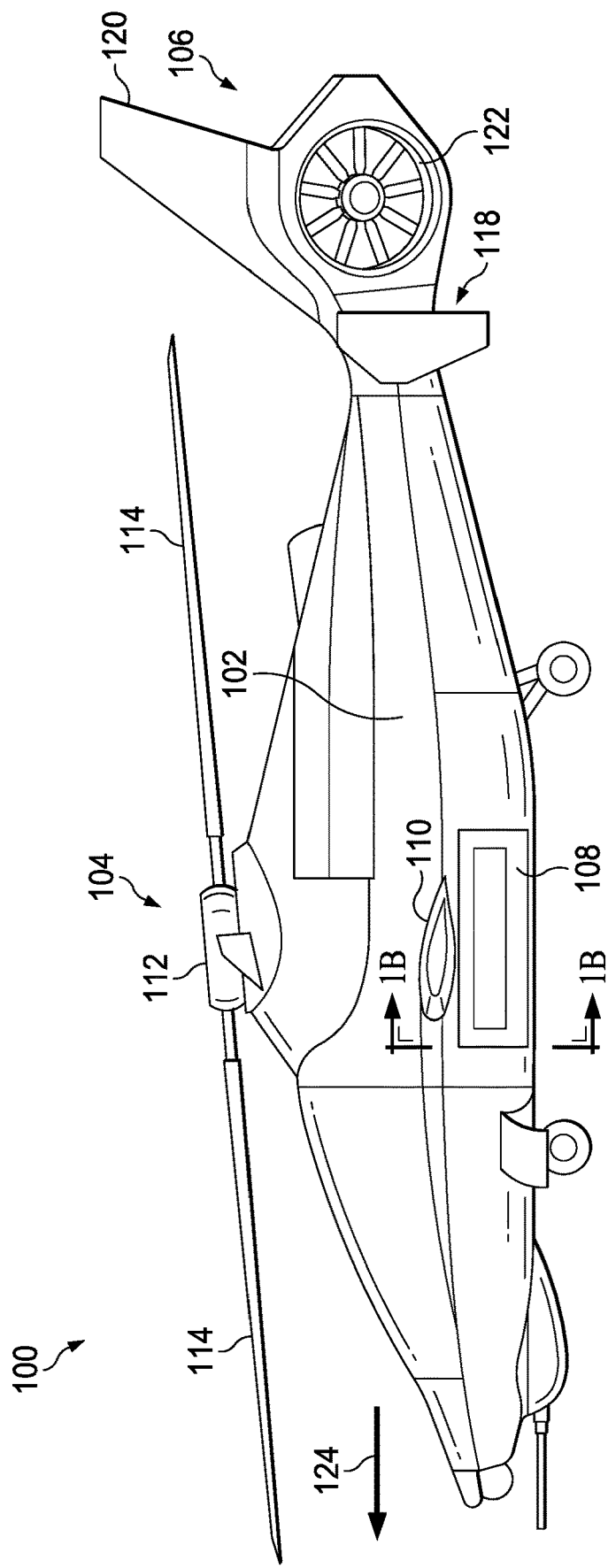
FIG. 1 is a side view of an example aircraft in accordance with certain embodiments of the present disclosure for a mechanism for implementing a translating payload bay pallet.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward", "aft", "inboard", and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage-of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Embodiments described herein provide a support structure and an actuation mechanism for extension of payload (which in certain embodiments comprises weapons) stowed in a payload, or weapons, bay of an aircraft fuselage outboard away from the fuselage to a firing position and for retraction of remaining weapons back into the payload bay. Embodiments enable weapons to remain level and oriented in the same direction when extended and while stowed and enable load reaction between the weapons and support rails to remain consistent and without rotation.

In accordance with embodiments described herein, both left and right pallets extend from and retract into a payload bay of the fuselage using a simple track arrangement. Pallets are supported on the outboard edge thereof using rollers mounted to the top of the fuselage payload bay and tracks mounted on top of the pallets. Pallets are supported on the inboard edge thereof using tracks mounted on the front and back sides of the fuselage payload bay and rollers mounted to the sides of the pallet arms. The left and right pallet arms extend across the fuselage butt line when retracted and cross over/under each other to avoid penetration holes in the pallet structure. Independent of being fully extended or retracted, the distance between the pallet inner and outer rollers is maintained at over approximately 25 inches to react cantilever loads. Lower and fore aft side loads on the pallets are reacted by rub strips or blocks. When fully extended or retracted, tapered stops on the pallets engage structure to minimize loads on the tracks and rollers. In certain embodiments, the payload bay doors slide in and out with the pallets. To aid pallet loading in this configuration, the tops of the doors are hingedly connected to the top of the pallet and can be manually rotated up for full access. In alternative embodiments, the tops of the doors are hingedly connected to the fuselage and engage pallets through tracks for actuation.

Mechanically, left and right pallets are driven by separate and independent drive mechanisms. Each pallet drive mechanism is mounted on the outboard side of the pallet and slides inboard and outboard with the pallet and the payload bay door. Pallets are driven outboard and inboard using dual mechanically synchronized rotating ball screws that are each grounded to the keel web using a non-rotating ball nut in a shaft. The probability of pallets jamming from racking on the tracks as a result of uneven loading is addressed by widely spacing the tracks and mechanically synchronizing the ball screws. Less probable failures, like ball screw and track jams, may be accessed from the opposite side of the payload bay, due at least in part to the fact that the two pallet mechanisms are mechanically independent from one another.

In one embodiment, an electric motor on the power unit is used for normal operation and a manual drive provision is included for operation without power or for maintenance. The power units drive the two ball screw actuators through the drive shafts. In the event of drive mechanism failure, the majority of probable failures can be accessed from the outboard side of the pallet by opening the door to the loading position.

In another embodiment, an electric motor on the power unit drives the combined ball screw/geared hinge actuators. The ball screw sections drive the pallets while the geared hinges section drives the doors, sequencing between section functions is entirely mechanical using a revolution counter. In the event of a drive mechanism failure, the majority of the probable failures may be accessed form the outboard side of the pallet by removing the door track retraining screws.

Referring to FIG. 1, illustrated therein is an example embodiment of an aircraft, which in the illustrated example is a rotorcraft 100. FIG. 1 portrays a side view of rotorcraft 100, which includes a fuselage 102, a primary rotor system 104, and an empennage 106. The fuselage 102 is the main body of the rotorcraft 100, which may include a cabin (e.g., for crew, passengers, and/or cargo) and/or may house certain mechanical components, electrical components, etc. (e.g., engine(s), transmission, flight controls, etc.). In accordance with features of embodiments described herein, the fuselage 102 also includes a payload bay covered by a payload bay door 108 disposed under a wing 110, which in some embodiments includes a support structure and actuation mechanism for extending internally stowed payload (e.g., weapons) outboard away from the fuselage 102 to a firing position. It will be recognized that, although not shown in the view illustrated in FIG. 1, the opposite side of the rotorcraft 100 also includes a wing and a payload bay door corresponding to the wing 110 and payload bay door 108.

The rotor system 104 is used to generate lift for rotorcraft 100. For example, the rotor system 104 (also generally referred to as the "rotor") may include a rotor hub 112 (also referred to as a "rotor hub assembly" or more generally as a "hub") coupled to a plurality of rotor blades 114 (also referred to generally as "blades"). Torque generated by the engine(s) of the rotorcraft causes the rotor blades 114 to rotate, which generates lift. The empennage 106 of the rotorcraft 100 includes a horizontal stabilizer 118, a vertical stabilizer 120, and a tail rotor or anti-torque system 122. Although not shown in the view illustrated in FIG. 1, a corresponding horizontal stabilizer is disposed on the other side of the rotorcraft 100 opposite the horizontal stabilizer 118. The horizontal stabilizer 118 and vertical stabilizer 120 respectively provide pitch and yaw stability for the rotorcraft 100. Moreover, tail rotor or anti-torque system 122 may be used to provide anti-torque and/or direction control for the rotorcraft 100.

Rotorcraft 100 relies on rotor system 104 for flight capabilities, such as controlling (e.g., managing and/or adjusting) flight direction, thrust, and lift of the rotorcraft. For example, the pitch of each rotor blade 114 can be controlled using collective control or cyclic control to selectively control direction, thrust, and lift of the rotorcraft 100. During collective control, all the of rotor blades 114 are collectively pitched together (e.g., the pitch angle is the same for all blades), which effects overall thrust and lift. During cyclic control, the pitch angle of each of the rotor blades 114 varies depending on where each blade is within a cycle of rotation (e.g., at some points in the rotation the pitch angle is not the same for all blades), which can affect direction of travel of the rotorcraft 100.

Aircraft such as rotorcraft 100 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades", "yoke/blades", "hub/yoke/blades", and variations thereof) to flapping, leading, and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap.

Figure 2B:
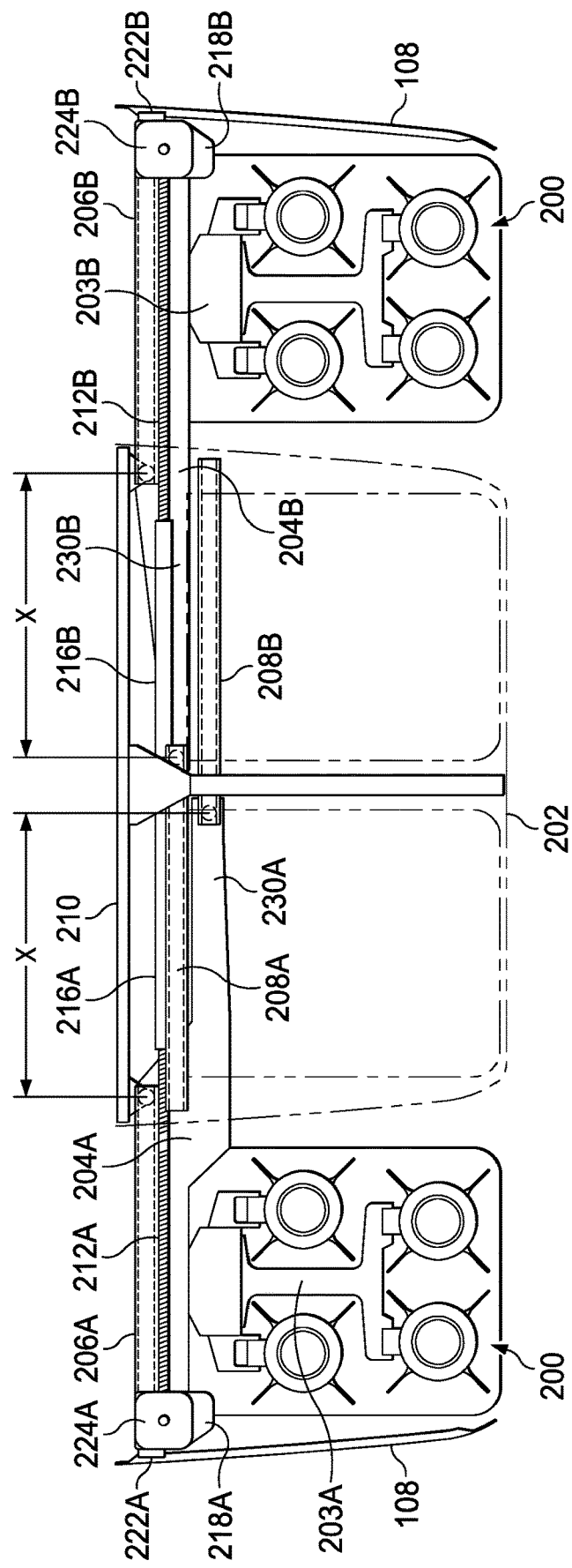
FIG. 2B is a more detailed front cut-away view of a portion of the aircraft of FIG. 1 in which payload is extended from the payload bay in accordance with features of one embodiment.

Referring now to FIGS. 2A, 2B, 3A, and 3B, illustrated therein are various cutaway views of portions of rotorcraft of FIG. 1 illustrating details of embodiments described herein for translating payload bay pallets in which the doors 108 are "fixed," as will be described. In particular, FIGS. 2A (front view) and 3A (top view) illustrate a first condition in which payload 200 is completely retracted and stowed within a payload bay 202 of the rotorcraft 100. FIGS. 2B (front view) and 3B (top view) illustrate a second condition in which the payload 200 is completely extended from the payload bay 202.

Figure 3A:
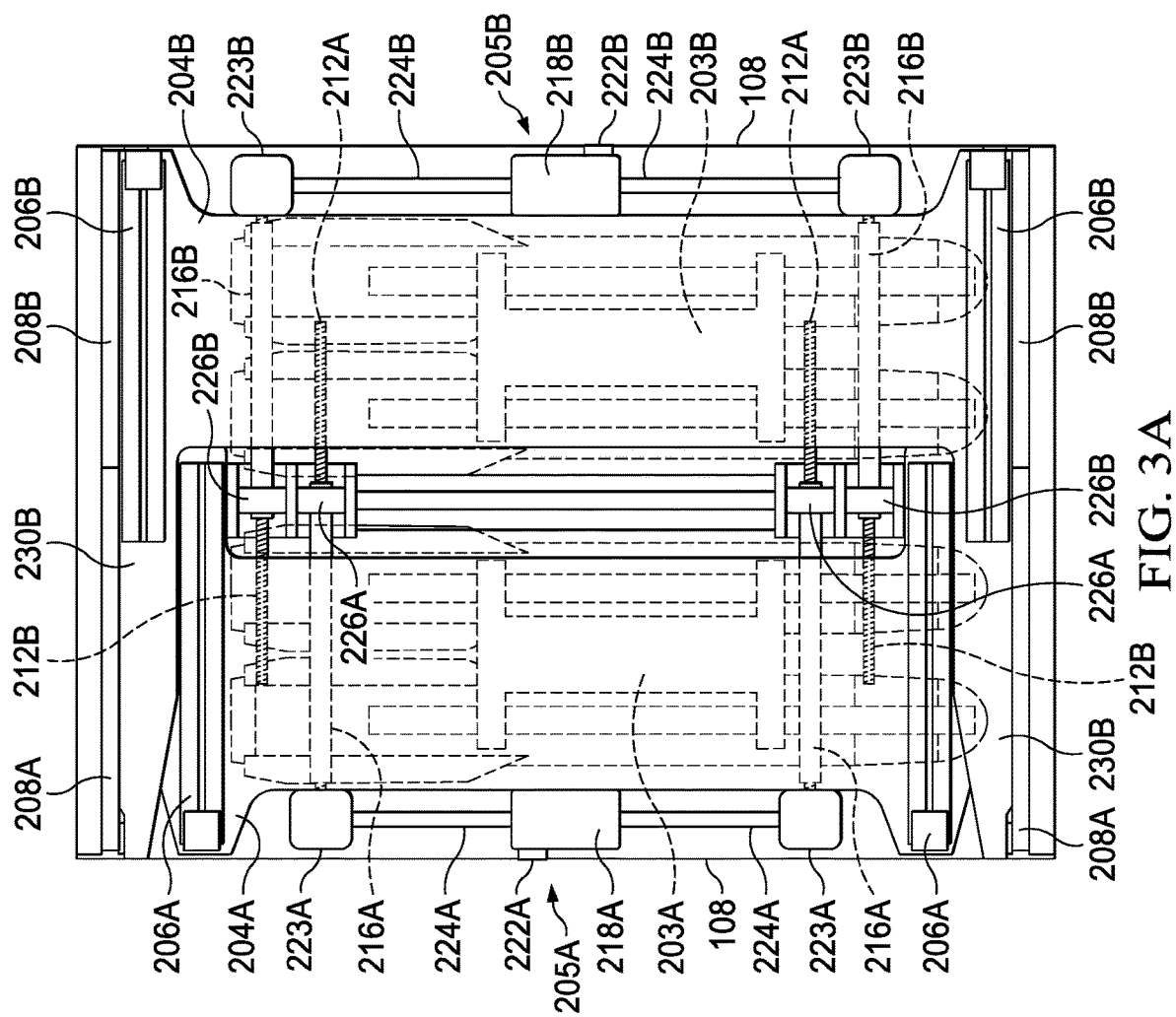
FIG. 3A is a top cut-away view of a portion of the aircraft of FIG. 1 in which payload is retracted and stowed in the payload bay in accordance with features of one embodiment.
Figure 3B:
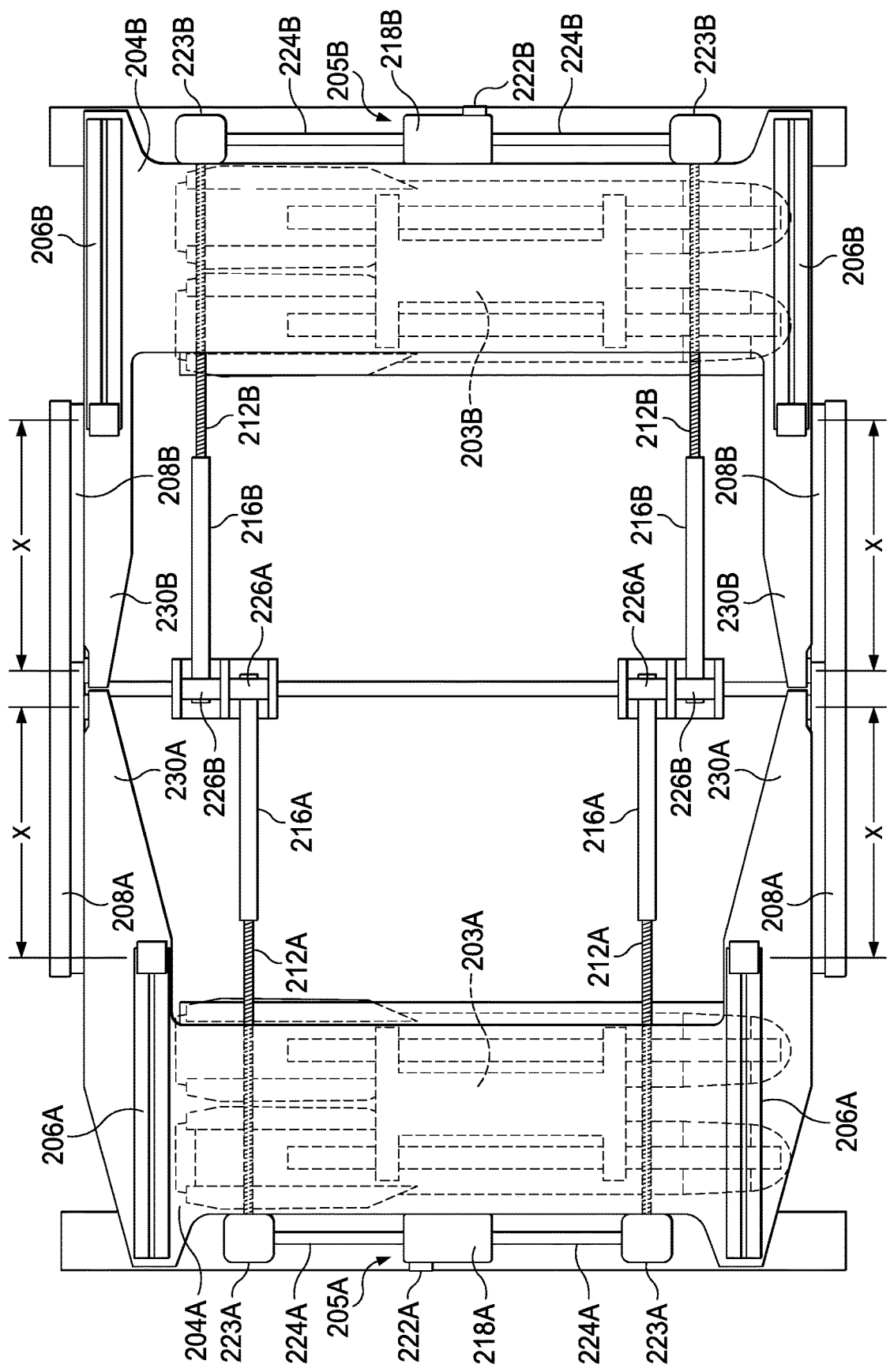
FIG. 3B is a top cut-away view of a portion of the aircraft of FIG. 1 in which payload is extended from the payload bay in accordance with features of one embodiment.

As shown in FIGS. 2A and 2B, payload 200 are disposed in racks 203A, 203B, connected to pallets 204A, 204B. In certain embodiments, racks 203A, 203B, may comprise one or more munitions launchers. As best shown in FIGS. 2B, 3A, and 3B, pallets 204A, 204B, are provided with upper track systems 206A, 206B, for connecting the pallets 204A, 204B, to an upper surface of the payload bay 202, and lower track systems 208A, 208B, for connecting the pallets 204A, 204B, to forward and aft sidewalls of the payload bay 202.

In accordance with features of embodiments, described herein, and as will be described in greater detail hereinbelow, the pallets 204A, 204B, (along with doors 108) are driven outboard and inboard by separate and independent drive mechanisms 205A, 205B, mounted on outboard sides of the pallets such that they move inboard and outboard with the respective pallet/door. Linear movement of the pallets inboard and outboard is effectuated using actuator mechanisms driven by drive mechanisms 205A, 205B, comprising dual mechanically synchronized ball screws 212A, 212B, grounded to a keel web via non-rotating ball nuts disposed in grounding shafts 216A, 216B. Drive mechanisms 205A, 205B, include electric power units 218A, 218B, for normal (automated) operation of the actuator assemblies to move pallets 204A, 204B, along tracks 206A, 206B, 208A, 208B. Manual drive inputs 222A, 222B, are provided in the electric power units 218A, 218B, for enabling manual operation of the actuator assemblies in the absence of power and/or for maintenance. Actuator gearbox assemblies 223A, 223B, are connected to actuator power units 218A, 218B, via power shafts 224A, 224B, for driving the ball screws 212A, 212B, relative to the shafts 216A, 216B, resulting in linear motion along the axis of the shafts. Shaft supports 226A, 226B, are provided for supporting inboard ends of shafts 216A, 216B.

As shown in FIGS. 2A and 2B, payload 200 may comprise eight air-to-surface weapons (e.g., missiles, bombs, or other munitions) and racks 203A, 203B, may comprise a munitions launcher for launching airborne weapons, such as payload 200, from rotorcraft 100.

It will be noted that, while payload 200 is illustrated as comprising eight weapons, embodiments described herein are not limited to this configuration and are applicable to payload comprising more or fewer weapons, depending on the space available in the payload bay. Moreover, the payload is not limited to weapons and could additionally and/or alternatively include fuel, air-launched drones, sensor packages, rockets, jammers, etc.

FIGS. 4A and 4B illustrate left and right side views, respectively, of the embodiments shown in FIGS. 2A, 2B, 3A, and 3B.

As illustrated in FIGS. 2A-4B, rollers mounted to the top of the payload bay 202 engage pallet mounted tracks 206A, 206B, to support outboard edges of the pallets 204A, 204B. Similarly, rollers mounted to the sides of pallet arms 230A, 230B, engage airframe mounted tracks 208A, 208B, which are mounted to the fore and aft sides of the payload bay 202, to support inboard edges of the pallets 204A, 204B. Pallet arms 230A, 230B, extend across the fuselage butt line when retracted and cross over/under each other to avoid penetration holes in the pallet structure. As illustrated in FIGS. 2B and 3B, in certain embodiments, regardless of whether the pallets 204A, 204B, are fully extended or retracted, a distance "X" between the roller of an upper track system 206 and the roller of the lower track system 208 on the corresponding side (forward or aft) is preferably maintained at more than approximately 25 inches to appropriately react cantilever loads. Rub strips or blocks may be provided within the fore and/or aft tracks to react lower fore and aft side loads on the pallets 204A, 204B. Moreover, as shown and described below, the pallets 204A, 204B, may be provided with tapered stops to engage structure to minimize loads on the tracks and rollers when the pallets are fully extended or retracted.

In the embodiment illustrated in FIGS. 2A-4B, the payload bay doors 108 slide in and out with the pallets 204A, 204B. To aid pallet loading in this embodiment, the tops of the doors 108 may be attached to the pallets 204A, 204B, via hinges such that they can be manually lifted to enable full access to the payload bay 202 while racks 203A, 203B, are retracted.

As previously noted, the likelihood of pallets 204A, 204B, jamming from racking on the tracks as a result of uneven loading is addressed by widely spacing the tracks 206A, 206B, and mechanically synchronizing the ball screws 212A, 212B. Less probable failures, like ball screw and track jams, may be accessed from the opposite side of the payload bay, due at least in part to the fact that the two pallet mechanisms are mechanically independent from one another.

As described above, actuator assemblies may be advantageously implemented using linear ball screw actuator assemblies for translating rotational motion to linear motion using a threaded shaft that provides a helical raceway for ball bearings that act as a precision screw. It will be recognized that other types of actuator assemblies may be employed without departing from the spirit of the scope of the disclosure. As used herein, "actuator" and/or "actuator assembly" refers to a component that is responsible for moving a mechanism or system, such as pallets 204A, 204B, in response to a control signal from an actuator control system, which in the illustrated embodiments may be incorporated into the aircraft or may be provided from a remote system in communication with the aircraft. The actuator control signal may be an electrical signal, pneumatic pressure, and/or hydraulic pressure, for example. Upon receipt of an actuator control signal, the actuator responds by providing mechanical motion. Although particular types of actuators may be described for use herein, it will be recognized that any number of different types of actuators may be employed, including, but not limited to, hydraulic actuators, pneumatic actuators, electric actuators, coiled polymer actuators, thermal actuators, magnetic actuators, and/or mechanical actuators.

Figure 5A:
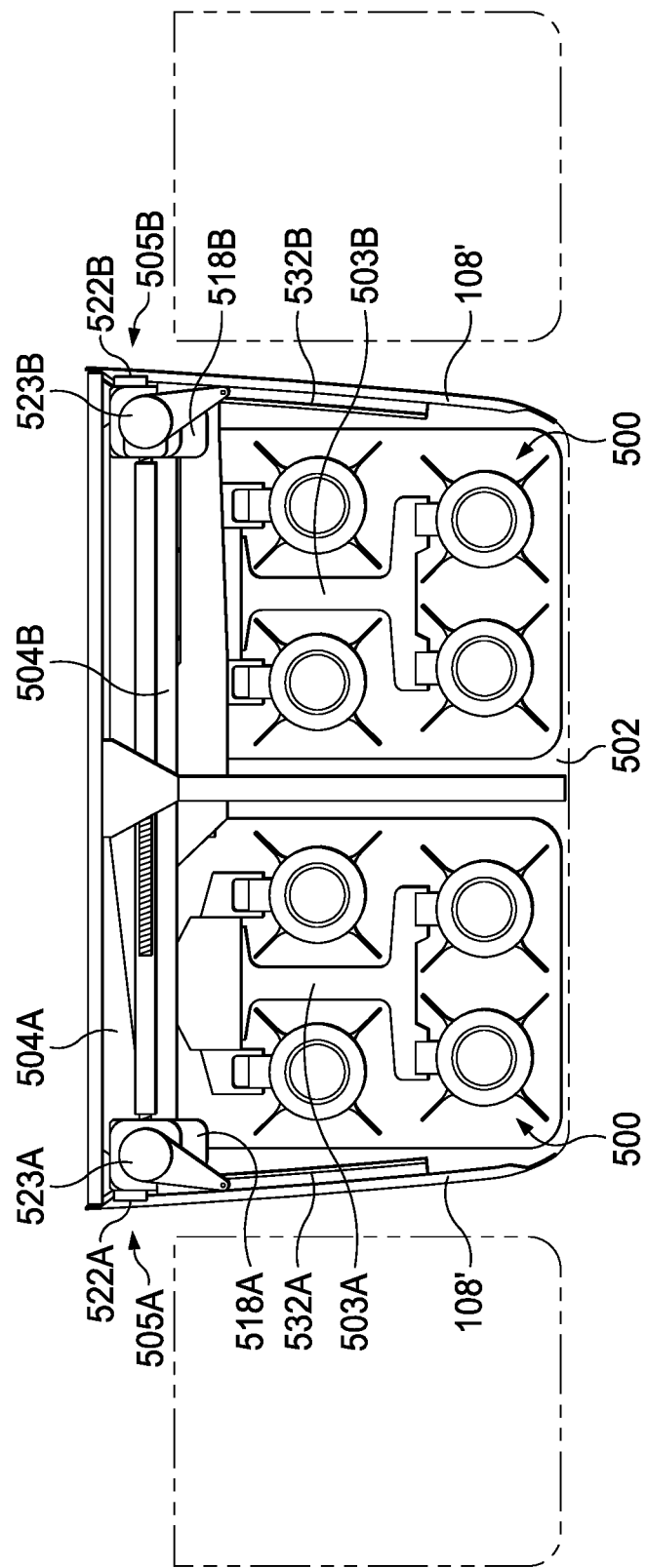
FIG. 5A is a front cut-away view of a portion of the aircraft of FIG. 1 in which payload is retracted and stowed in the payload bay in accordance with features of an alternative embodiment.
Figure 5B:
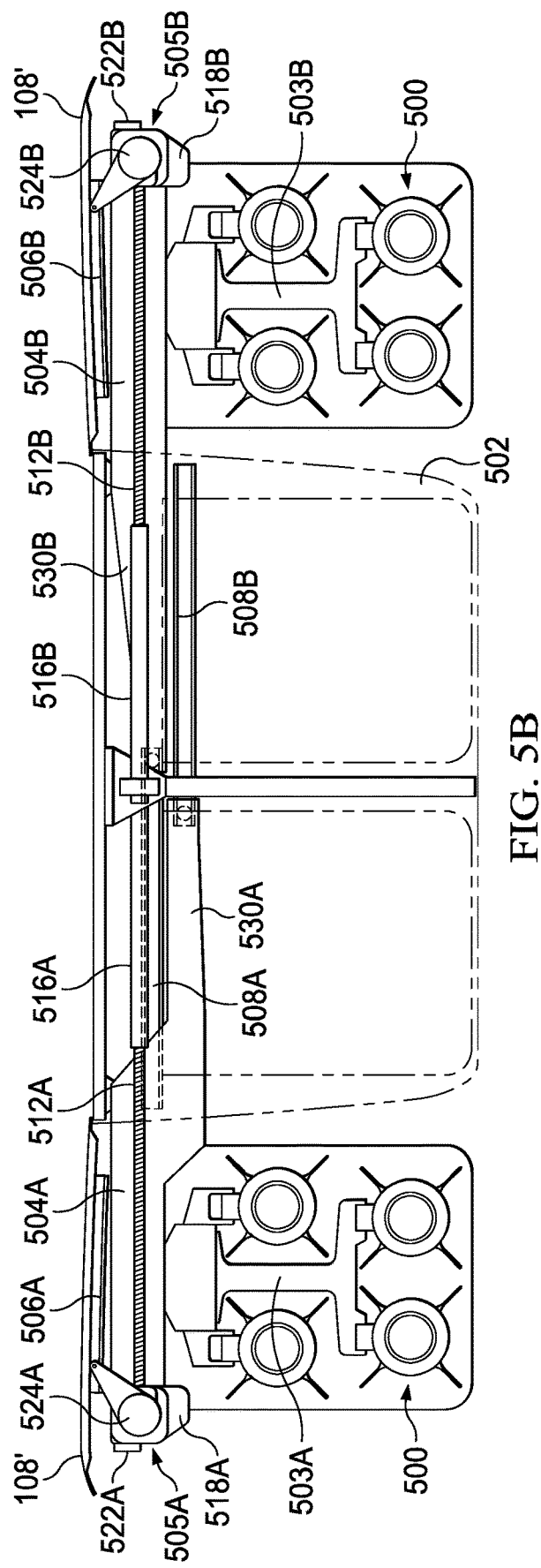
FIG. 5B is a more detailed front cut-away view of a portion of the aircraft of FIG. 1 in which payload is extended from the payload bay in accordance with features of the alternative embodiment.

Turning now FIGS. 5A, 5B, 6A, and 6B, illustrated therein are various cutaway views of portions of a payload bay portion of rotorcraft 100 (FIG. 1) illustrating details of embodiments described herein for translating payload bay pallets in which doors 108 are "actuated," as will be described. In particular, FIGS. 5A (front view) and 6A (top view) illustrate a first condition in which payload 500 is completely retracted and stowed within a payload bay 502 of the rotorcraft 100 (FIG. 1). FIGS. 5B (front view) and 6B (top view) illustrate a second condition in which the payload 500 is completely extended from the payload bay 502.

Figure 6A:
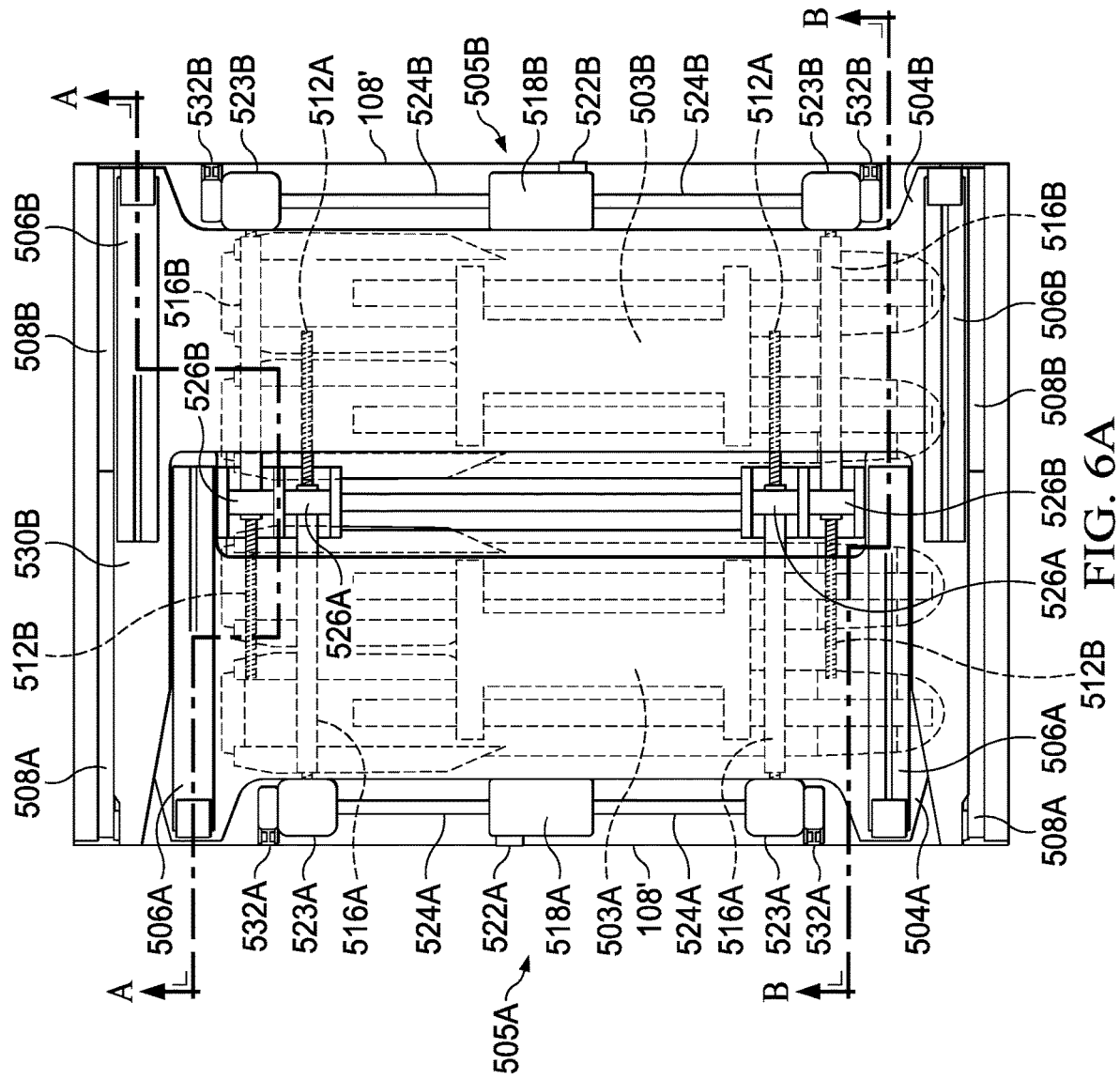
FIG. 6A is a top cut-away view of a portion of the aircraft of FIG. 1 in which payload is retracted and stowed in the payload bay in accordance with features of the alternative embodiment.
Figure 6B:
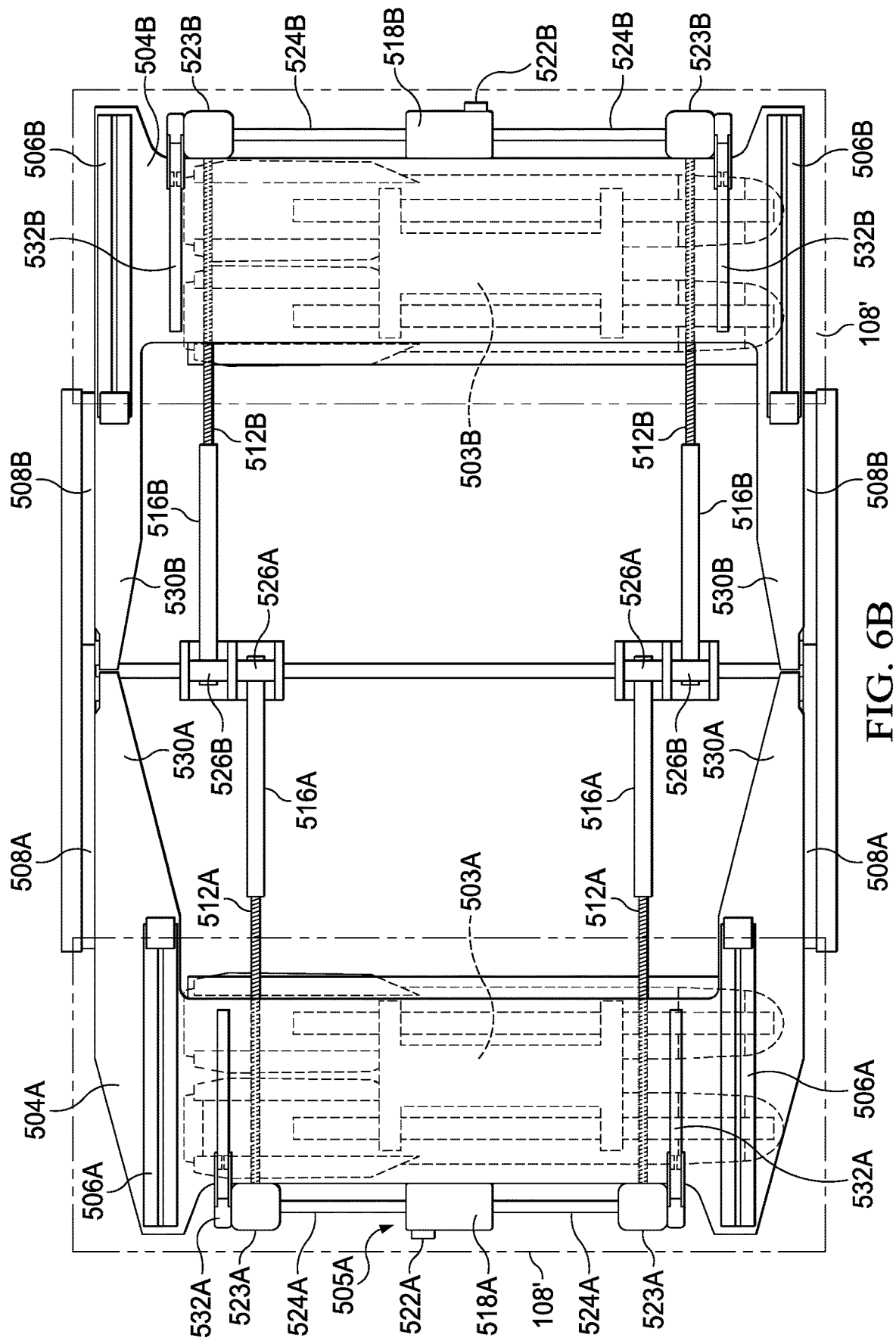
FIG. 6B is a top cut-away view of a portion of the aircraft of FIG. 1 in which payload is extended from the payload bay in accordance with features of the alternative embodiment.

As shown in FIGS. 5A and 5B, payload 500 are disposed in racks 503A, 503B, connected to pallets 504A, 504B. In certain embodiments, racks 503A, 503B, may comprise one or more munitions launchers. As best shown in FIGS. 5B, 6A, and 6B, pallets 504A, 504B, are provided with upper track systems 506A, 506B, for connecting the pallets 504A, 504B, to an upper surface of the payload bay 502, and lower track systems 508A, 508B, for connecting the pallets 504A, 504B, to forward and aft sidewalls of the payload bay 502.

In accordance with features of embodiments, described herein, and as will be described in greater detail hereinbelow, the pallets 504A, 504B, are driven outboard and inboard by separate and independent drive mechanisms 505A, 505B, mounted on outboard sides of the pallets such that they move inboard and outboard with the respective pallet/door. Linear movement of the pallets inboard and outboard is effectuated using actuator mechanisms driven by drive mechanisms 505A, 505B, comprising dual mechanically synchronized ball screws 512A, 512B, grounded to a keel web via non-rotating ball nuts disposed in grounding shafts 516A, 516B. Drive mechanisms 505A, 505B, include electric power units 518A, 518B, for normal (automated) operation of the actuator assemblies to move pallets 504A, 504B, along tracks 506A, 506B, 508A, 508B. Manual drive inputs 522A, 522B, are provided in the electric power units 518A, 518B, for enabling manual operation of the actuator assemblies in the absence of power and/or for maintenance. Combined actuator gearboxes 523A, 523B, are connected to actuator power units 518A, 518B, via power shafts 524A, 524B, for driving the ball screws 512A, 512B, relative to the shafts 516A, 516B, resulting in linear motion along the axis of the shafts. Shaft supports 526A, 526B, are provided for supporting inboard ends of shafts 516A, 516B. Additionally, the combined actuator gearboxes 523A, 523B, drive actuators for the doors 108' as will be described in greater detail below, with sequencing between opening and closing of doors 108- and outboard and inboard movement of pallets 504A, 504B, being a mechanical function implemented using a revolution counter.

As shown in FIGS. 5A and 5B, payload 500 may comprise eight air-to-surface weapons (e.g., missiles, bombs, or other munitions) and racks 503A, 503B, may comprise a munitions launcher for launching airborne weapons, such as payload 500, from rotorcraft 100.

It will be noted that, while payload 500 is illustrated as comprising eight weapons, embodiments described herein are not limited to this configuration and are applicable to payload comprising more or fewer weapons, depending on the space available in the payload bay. Moreover, the payload is not limited to weapons and could additionally and/or alternatively include fuel, air-launched drones, sensor packages, rockets, jammers, etc.

Figure 7A:
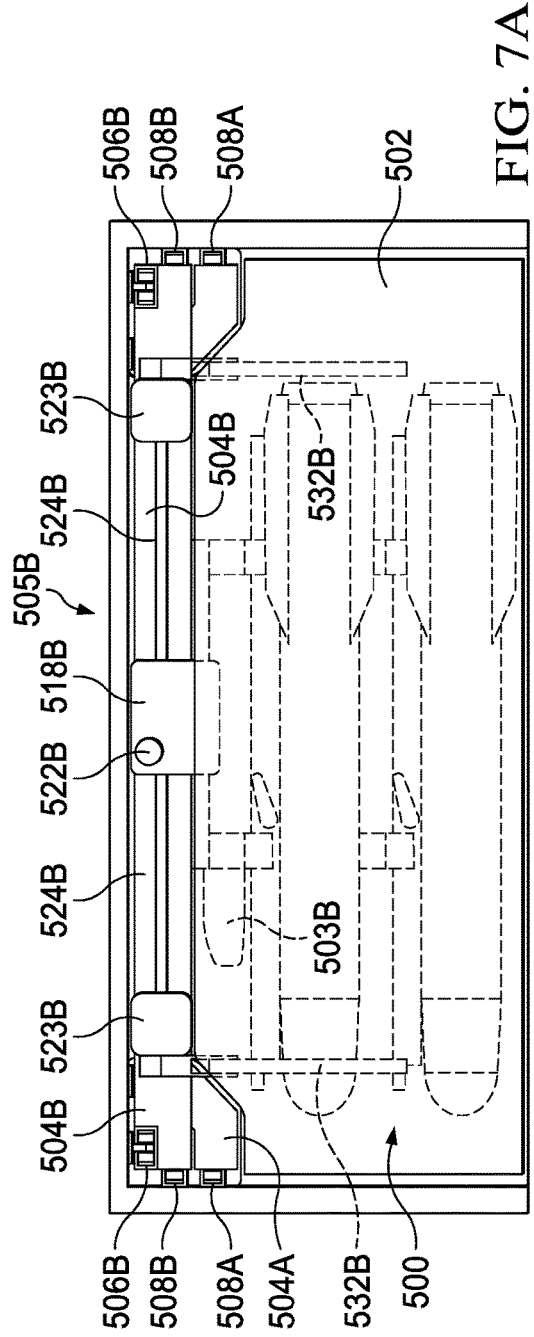
FIG. 7A is a left cut-away view of a portion of the aircraft of FIG. 1 in which payload is retracted and stowed in the payload bay in accordance with features of the alternative embodiment.
Figure 7B:
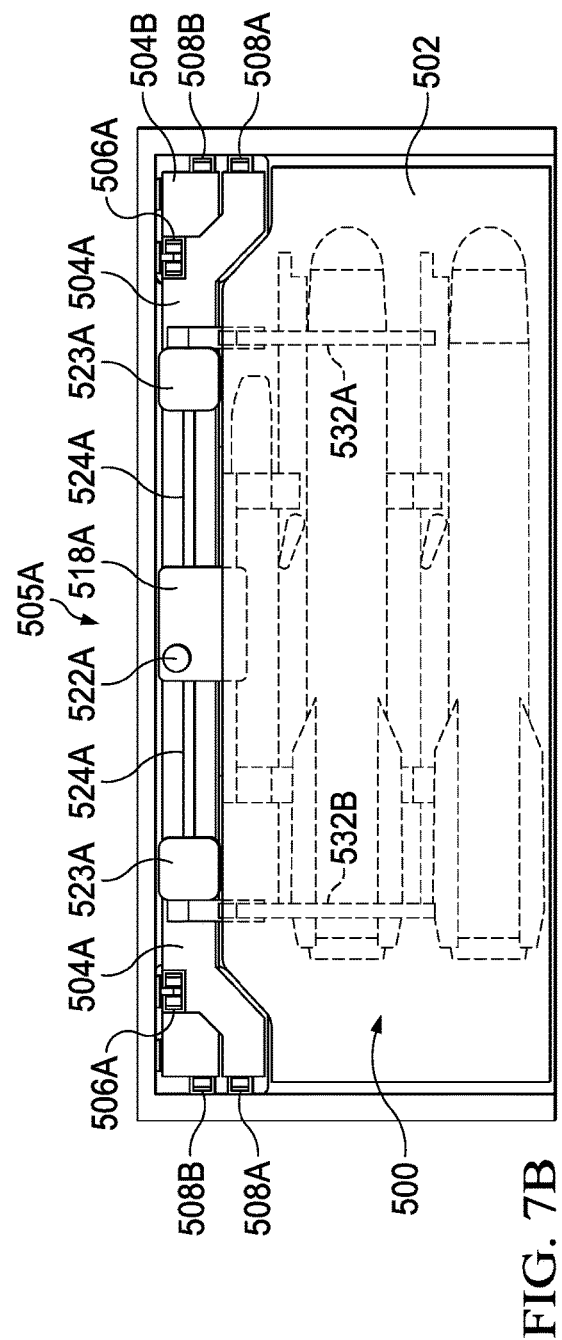
FIG. 7B is a right cut-away view of a portion of the aircraft of FIG. 1 in which payload is extended from the payload bay in accordance with features of the alternative embodiment.

FIGS. 7A and 7B illustrate left and right side views, respectively, of the embodiments shown in FIGS. 5A, 5B, 6A, and 6B.

As illustrated in FIGS. 5A-6B, rollers mounted to the top of the payload bay 502 engage pallet mounted tracks 506A, 506B, to support outboard edges of the pallets 504A, 504B. Similarly, rollers mounted to the sides of pallet arms 530A, 530B, engage airframe mounted tracks 508A, 508B, which are mounted to the fore and aft sides of the payload bay 502, to support inboard edges of the pallets 504A, 504B. Pallet arms 530A, 530B, extend across the fuselage butt line when retracted and cross over/under each other to avoid penetration holes in the pallet structure. As illustrated in FIGS. 5B and 6B, in certain embodiments, regardless of whether the pallets 504A, 504B, are fully extended or retracted, a distance "X" between the roller of an upper track system 506 and the roller of the lower track system 508 on the corresponding side (forward or aft) is preferably maintained at more than approximately 25 inches to appropriately react cantilever loads. Rub strips or blocks may be provided to react lower fore and aft side loads on the pallets 504A, 504B. Moreover, the pallets 504A, 504B, may be provided with tapered stops to engage structure to minimize loads on the tracks and rollers when the pallets are fully extended or retracted.

In the embodiment illustrated in FIGS. 5A-6B, the payload bay doors 108' are hingedly attached to the fuselage 102 (FIG. 1) along the top of payload bay 502 and engage pallets 504A, 504B, through door actuation tracks 532A, 532B, such that they may be driven open and closed by door actuators (best shown in FIGS. 9A-9G below), driven by gearboxes 523A, 523B, that engage the door actuation tracks 532A, 532B, via rollers for example, as pallets 504A, 504B, slide outboard from the payload bay 502 and inboard into the payload bay, respectively.

As previously noted, the likelihood of pallets 504A, 504B, jamming from racking on the tracks as a result of uneven loading is addressed by widely spacing the tracks 506A, 506B, and mechanically synchronizing the ball screws 512A, 512B. Less probable failures, like ball screw and track jams, may be accessed from the opposite side of the payload bay, due at least in part to the fact that the two pallet mechanisms are mechanically independent from one another. In the event of a drive mechanism failure, the majority of probably failures may be accessed from the outboard side of the pallet by removing door track retaining screws.

Figure 8:
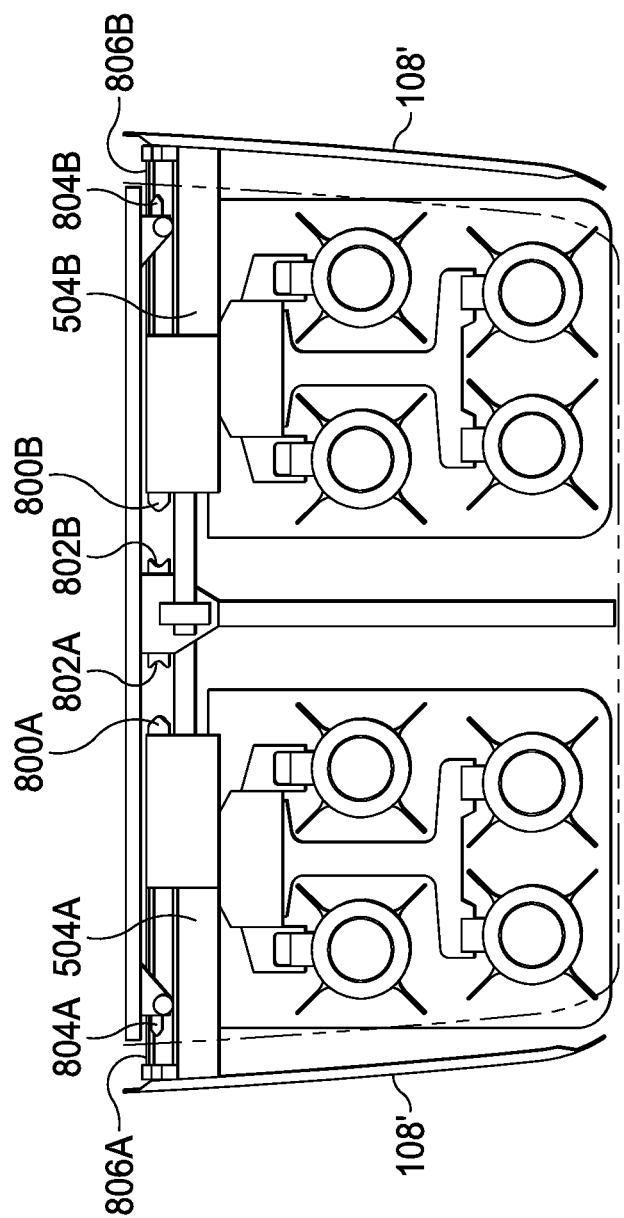
FIG. 8 is a cut-away view of a portion of the aircraft of FIG. 1 along a cut line A-A of FIG. 6A.

Actuation of the doors 108' in concert with the pallets 504A, 504B, will now be described in greater detail with reference to FIG. 8, which illustrates a cut-away view along a cut line A-A of FIG. 6A, and FIGS. 9A-9G, which illustrate views along a cutline B-B of FIG. 6A. Referring first to FIG. 8, illustrated therein are inboard retract stops 800A, 800B, disposed on inboard edges of pallets 504A, 504B, for engaging respective inboard retract stop receptacles 802A, 802B, and outboard retract pins 804A, 804B, disposed on outboard edges of pallets 504A, 504B, for engaging respective outboard retract pin receptacles 806A, 806B, when pallets 504A, 504B, are fully retracted into payload bay 502 and doors 108' are fully closed.

Figure 9A:
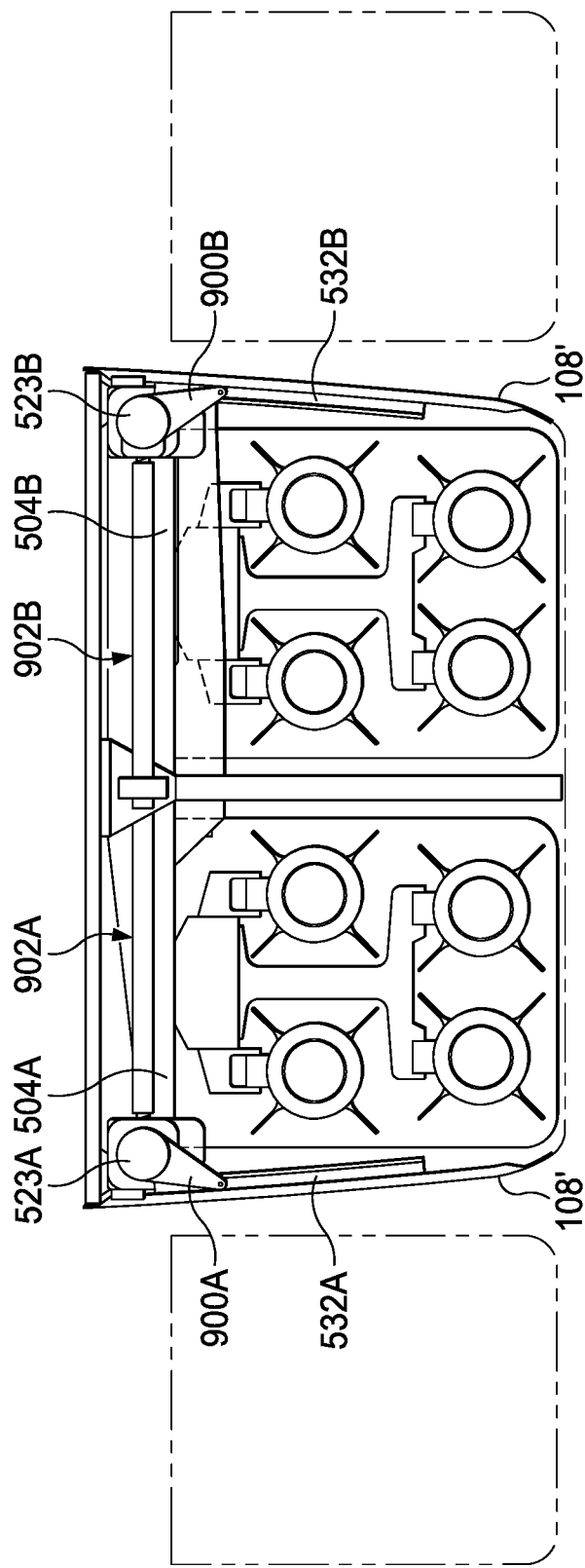
FIGS. 9A-9G are cut-away views of a portion of the aircraft of FIG. 1 along a cut line B-B of FIG. 6A illustrating operation of alternative embodiments described herein for extending payload from and retracting payload into the payload bay of the aircraft.
Figure 9B:
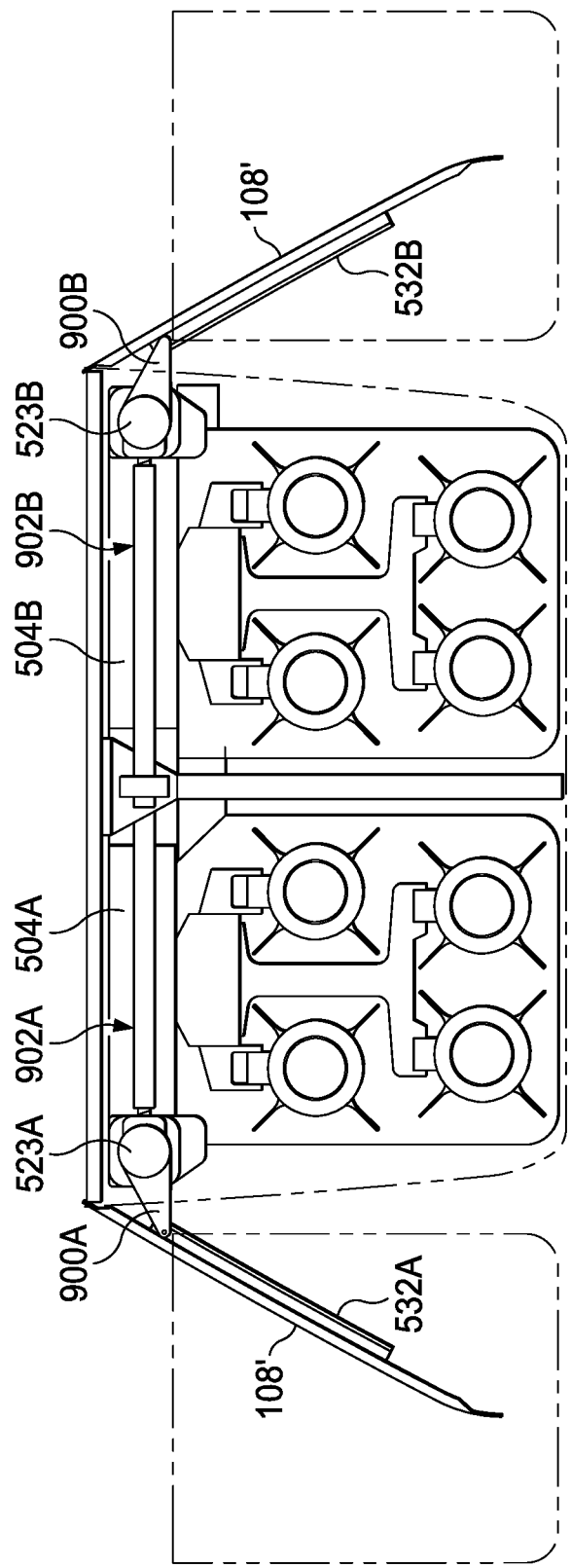

Referring now to FIGS. 9A-9G, operation of the hinged doors 108' will be shown and described in greater detail. As shown in FIGS. 9A-9G, combined actuator gearboxes 523A, 523B, drive door actuator assemblies 900A, 900B, which control the rotational position of doors 108', and pallet actuator assemblies 902A, 902B, which control linear position of the pallets 504A, 504B, via the ball screw 512A, 512B, (FIG. 5B) and shaft 516A, 516B, (FIG. 5B) combination. In FIG. 9A, the door actuator assemblies 900A, 900B, are rotated approximately zero degrees and pallet actuator assemblies 902A, 902B, are extended approximately zero inches. In this condition, or state, the doors 108' are completely closed and the pallets 504A, 504B, are completely retracted within the payload bay 202. In FIG. 9B, the door actuator assemblies 900A, 900B, are rotated approximately 59 degrees and pallet actuator assemblies 902A, 902B, are extended zero inches. In this state, the doors 108' are partially opened, but pallets 504A, 504B, remain fully retracted and have not yet begun to be extended from the payload bay 202.

Figure 9C:
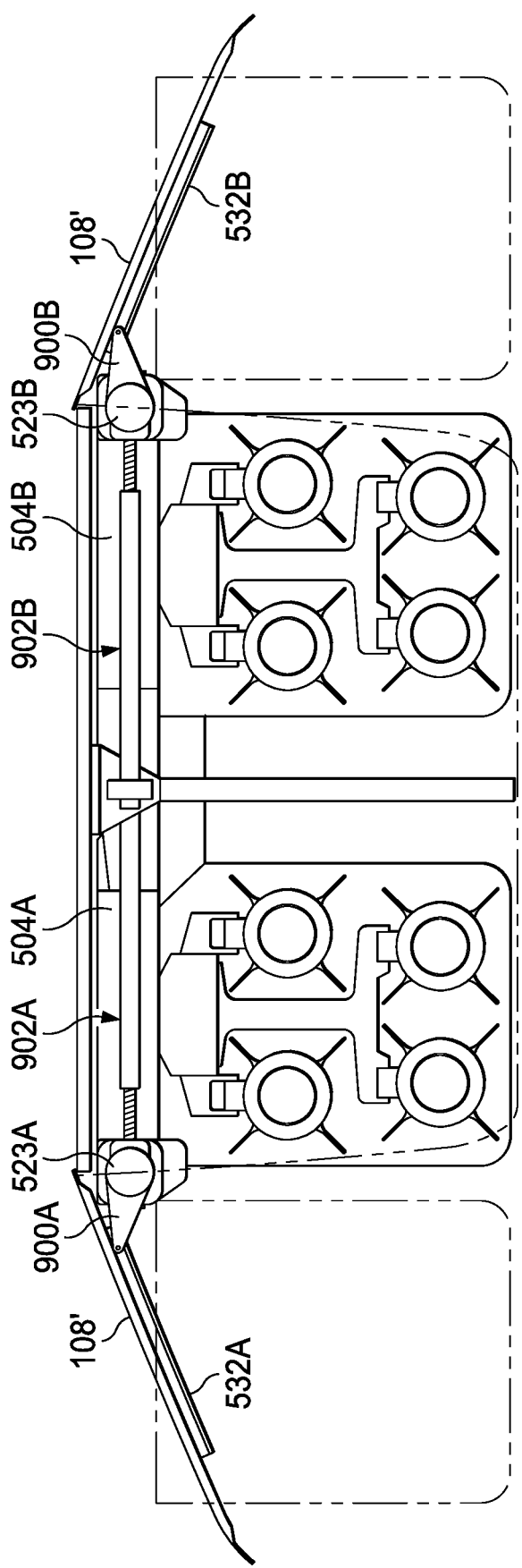
Figure 9D:
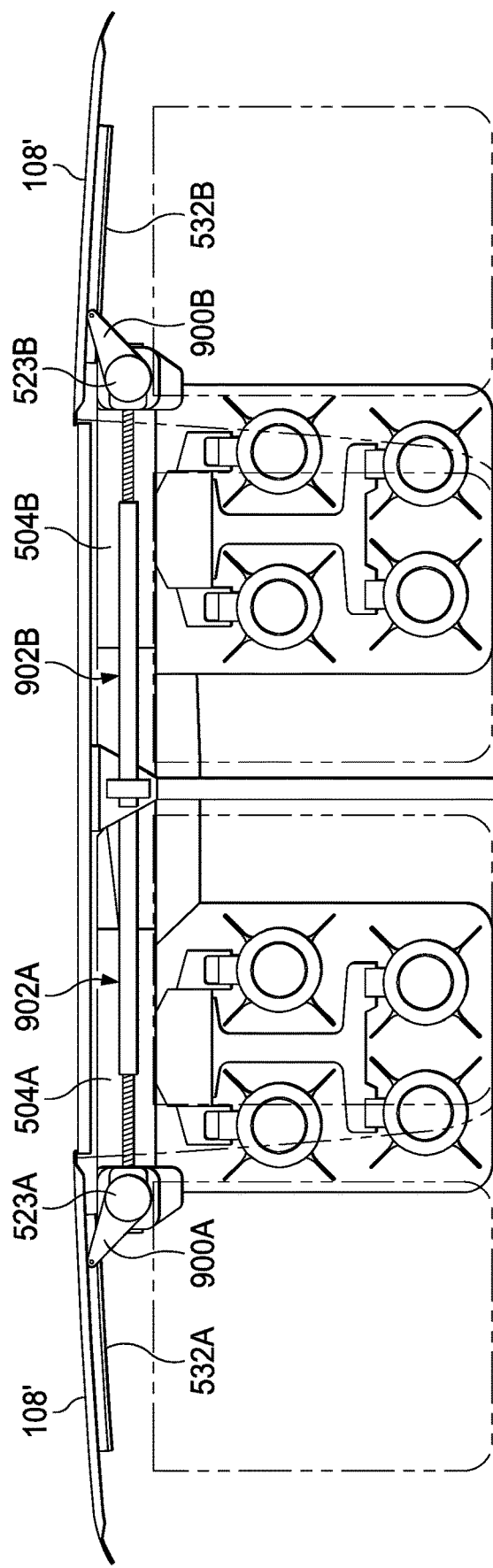
Figure 9E:
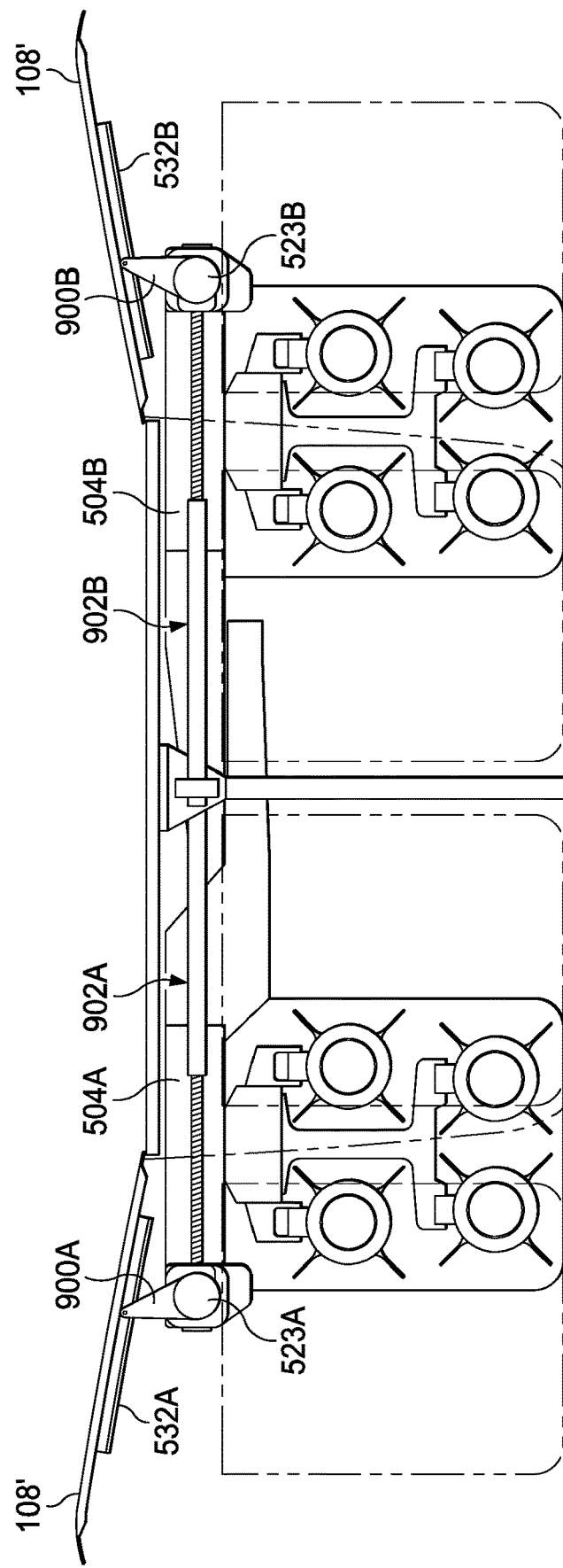
Figure 9F:
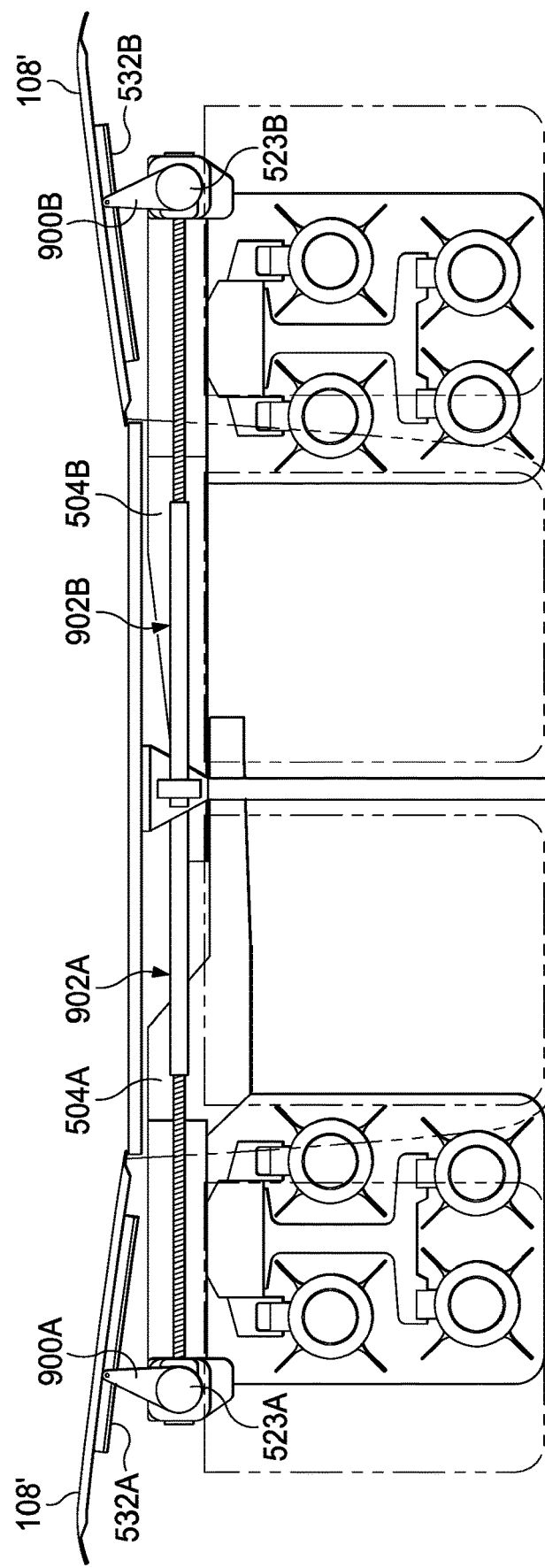
Figure 9G:
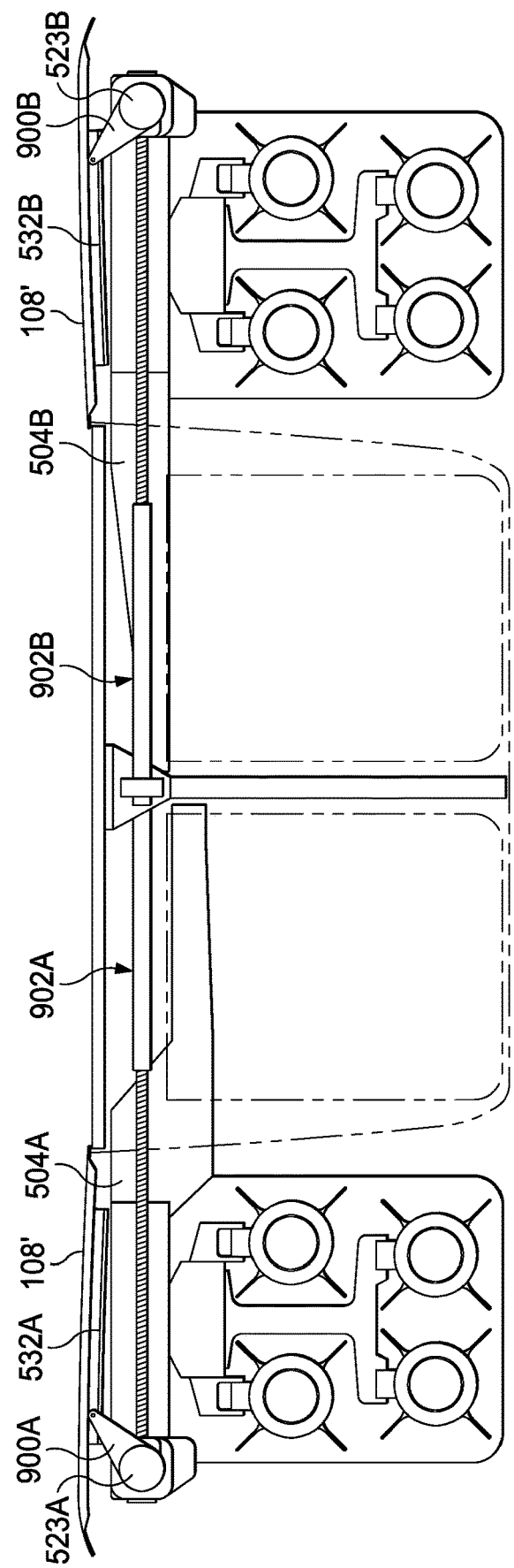

In FIG. 9C, the door actuator assemblies 900A, 900B, are rotated approximately 79 degrees and pallet actuator assemblies 902A, 902B, are extended 4.0 inches. In this condition, the doors 108' are open almost 80 degrees and pallets 504A, 504B, have begun to be extended out of the payload bay 502. FIGS. 9D-9F illustrate the door actuator assemblies 900A, 900B, rotated approximately 99 degrees, approximately 139 degrees, and approximately 180 degrees, respectively, and the pallet actuator assemblies 902A, 902B, are extended approximately 8.8 inches, approximately 15.4 inches, and approximately 23.4 inches, respectively. FIG. 9G illustrates a condition in which the pallets 504A, 504B, are completely extended, in which door actuator assemblies 900A, 900B, are rotated approximately 221 degrees and pallet actuators portions 902A, 902B, are extended approximately 31 inches.

It will be recognized that the angular and linear measurements set forth herein are provided only for the sake of illustrating the overall kinematic operation of one embodiment of the door and pallet actuator assemblies and that other arrangements may be advantageously employed without departing from the spirit of the scope of the disclosure.

As described above, pallet actuator assemblies may be advantageously implemented using linear ball screw actuator assemblies for translating rotational motion to linear motion using a threaded shaft that provides a helical raceway for ball bearings that act as a precision screw. It will be recognized that other types of actuator assemblies may be employed without departing from the spirit of the scope of the disclosure. As used herein, "actuator" and/or "actuator assembly" refers to a component that is responsible for moving a mechanism or system, such as pallets 504A, 504B, in response to a control signal from an actuator control system, which in the illustrated embodiments may be incorporated into the aircraft or may be provided from a remote system in communication with the aircraft. The actuator control signal may be an electrical signal, pneumatic pressure, and/or hydraulic pressure, for example. Upon receipt of an actuator control signal, the actuator responds by providing mechanical motion. Although particular types of actuators may be described for use herein, it will be recognized that any number of different types of actuators may be employed, including, but not limited to, hydraulic actuators, pneumatic actuators, electric actuators, coiled polymer actuators, thermal actuators, magnetic actuators, and/or mechanical actuators.

Door actuator assemblies 900A, 900B, may be implemented as arms that receive power and revolution counts from the power shafts, as noted above. In particular, the power shafts in cooperation with a mechanical counter/synchronizer coordinate the opening of the doors with movement of the pallets outboard, as well as the closing of the doors with movement of the pallets inboard.

Example 1 is a system including a first track assembly for connecting a top surface of a pallet supporting payload to an upper interior surface of a payload bay of an aircraft; a second track assembly for connecting a side surface of the pallet to a side interior surface of the payload bay; and a pallet actuator system for selectively moving the pallet along the first and second track assemblies between a first position in which the pallet is fully extended from the payload bay and a second position in which the pallet is fully retracted into the payload bay.

In Example 2, the system of Example 1 may further include the pallet actuator system comprising a linear actuator.

In Example 3, the system of any of Examples 1 or 2 may further include the linear actuator comprises a ball screw actuator.

In Example 4, the system of any of Examples 1-3 may further include a rack suspended from the pallet, wherein the payload is disposed in the rack.

In Example 5, the system of any of Examples 1-4 may further include the rack comprising a munitions launcher and the payload comprising at least one air-to-surface weapon.

In Example 6, the system of any of Examples 1-5 may further include a payload bay door connected to the pallet.

In Example 7, the system of any of Examples 1-6 may further include a top edge of the payload bay door is connected to an outboard edge of the pallet via at least one hinge.

In Example 8, the system of any of Examples 1-7 may further include the first track assembly comprising a first track disposed on the top surface of the pallet proximate a forward end thereof and a second track disposed on the top surface of the pallet proximate an aft end thereof.

In Example 9, the system of any of Examples 1-8 may further include the second track assembly comprising a first track disposed on a forward side interior surface of the payload bay and a second track disposed on an aft side interior surface of the payload bay.

In Example 10, the system of any of Examples 1-9 may further include a payload bay door for covering the payload bay; and a door actuator system for selectively opening and closing the payload bay door.

In Example 11, the system of any of Examples 1-10 may further include the door actuator system further comprising a door actuator assembly for coordinating the opening and closing of the payload bay door with movement of the pallet between the first and second positions.

In Example 12, the system of any of Examples 1-11 may further include a door track assembly disposed on an interior surface of the payload bay door for engaging the door actuator system.

Example 13 is an aircraft including a payload bay; a first pallet disposed on a first side of the payload bay; a second pallet disposed on a second side of the payload bay; a first top track assembly for connecting a top surface of the first pallet supporting payload to an upper interior surface of the payload bay; a second top rack assembly for connecting a top surface of the second pallet supporting payload to the upper interior surface of the payload bay; a first lower track assembly for connecting a side surface of the second pallet to a side interior surface of the payload bay; a second lower track assembly for connecting a side surface of the second pallet to the side interior surface of the payload bay; a first pallet actuator system for selectively moving the first pallet along the first track assemblies between an extended position of the first pallet and a retracted position of the first pallet; and a second pallet actuator system for selectively moving the second pallet along the second track assemblies between an extended position of the second pallet and a retracted position of the second pallet.

In Example 14, the aircraft of Example 13 may further include the first and second pallet actuator systems comprising linear actuators.

In Example 15, the aircraft of any of Examples 13-14 may further include the payload comprising at least one air-to-surface weapon.

In Example 16, the aircraft of any of Examples 13-15 may further include a first payload bay door connected to an outboard edge of the first pallet via at least one first hinge and a second payload bay door connected to an outboard edge of the second pallet via at least one second hinge.

In Example 17, the aircraft of any of Examples 13-16 may further include a first payload bay door associated with the first pallet; a second payload bay door associated with the second pallet; a first door actuator system for selectively opening and closing the first payload bay door; a second door actuator system for selectively opening and closing the second payload bay door; a first door track assembly disposed on an interior surface of the first payload bay door for engaging the first door actuator assembly; and a second door track assembly disposed on an interior surface of the second payload bay door for engaging the second door actuator assembly; wherein the first and second payload bay door actuator systems further comprise door actuator assemblies for coordinating the opening and closing of the first and second payload bay doors with movement of the first and second pallets between the first and second positions.

In Example 18, the aircraft of any of Examples 13-17 may further include a first pallet drive mechanism mounted on an outboard side of the first pallet and a second pallet drive mechanism mounted on an outboard side of the second pallet.

In Example 19, the aircraft of any of Examples 13-18 may further include each of the upper track assemblies comprising a first track disposed on the top surface of the respective one of the pallets proximate a forward end thereof and a second track disposed on the top surface of the respective one of the pallets proximate an aft end thereof and wherein each of the lower track assemblies comprises a first track disposed on a forward side interior surface of the payload bay and a second track disposed on an aft side interior surface of the payload bay.

Example 20 is a method comprising providing a first track assembly for connecting a top surface of a pallet supporting payload to an upper interior surface of a payload bay of an aircraft; providing a second track assembly for connecting a side surface of the pallet to a side interior surface of the payload bay; and selectively moving the pallet along the first and second track assemblies between a first position in which the pallet is fully extended from the payload bay and a second position in which the pallet is fully retracted into the payload bay using a linear actuator.

The diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The embodiments described throughout this disclosure provide numerous technical advantages, including by way of example, maintaining performance at high angles of attack while increasing performance at low angles of attack.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A system comprising:
a first track assembly for connecting a top surface of a pallet supporting payload to an upper interior surface of a payload bay of an aircraft;
a second track assembly for connecting a side surface of the pallet to a side interior surface of the payload bay;
a pallet actuator system for selectively moving the pallet along the first and second track assemblies between a first position in which the pallet is fully extended from the payload bay and a second position in which the pallet is fully retracted into the payload bay; and
a payload bay door connected to the pallet;
wherein a top edge of the payload bay door is connected to an outboard edge of the pallet via at least one hinge.

2. The system of claim 1, wherein the pallet actuator system comprises a linear actuator.

3. The system of claim 2, wherein the linear actuator comprises a ball screw actuator.

4. The system of claim 1 further comprising a rack suspended from the pallet, wherein the payload is disposed in the rack.

5. The system of claim 4, wherein the rack comprises a munitions launcher and the payload comprises at least one air-to-surface weapon.

6. The system of claim 1, wherein the first track assembly comprises a first track disposed on the top surface of the pallet proximate a forward end thereof and a second track disposed on the top surface of the pallet proximate an aft end thereof.

7. The system of claim 1, wherein the second track assembly comprises a first track disposed on a forward side interior surface of the payload bay and a second track disposed on an aft side interior surface of the payload bay.

8. The system of claim 1 further comprising:
a door actuator system for selectively opening and closing the payload bay door.

9. The system of claim 8, wherein the door actuator system further comprises a door actuator assembly for coordinating the opening and closing of the payload bay door with movement of the pallet between the first and second positions.

10. The system of claim 8 further comprising a door track assembly disposed on an interior surface of the payload bay door for engaging the door actuator system.

11. An aircraft comprising:
a payload bay;
a first pallet disposed on a first side of the payload bay;
a second pallet disposed on a second side of the payload bay;
a first top track assembly for connecting a top surface of the first pallet supporting payload to an upper interior surface of the payload bay;
a second top track assembly for connecting a top surface of the second pallet supporting payload to the upper interior surface of the payload bay;
a first lower track assembly for connecting a side surface of the first pallet to a side interior surface of the payload bay;
a second lower track assembly for connecting a side surface of the second pallet to the side interior surface of the payload bay;
a first pallet actuator system for selectively moving the first pallet along the first track assemblies between an extended position of the first pallet and a retracted position of the first pallet;
a second pallet actuator system for selectively moving the second pallet along the second track assemblies between an extended position of the second pallet and a retracted position of the second pallet; and
a first payload bay door connected to an outboard edge of the first pallet via at least one first hinge and a second payload bay door connected to an outboard edge of the second pallet via at least one second hinge.

12. The aircraft of claim 11, wherein the first and second pallet actuator systems comprise linear actuators.

13. The aircraft of claim 11, wherein the payload comprises at least one air-to-surface weapon.

14. The aircraft of claim 11 further comprising:
a first door actuator system for selectively opening and closing the first payload bay door;
a second door actuator system for selectively opening and closing the second payload bay door;

a first door track assembly disposed on an interior surface of the first payload bay door for engaging the first door actuator assembly; and a second door track assembly disposed on an interior surface of the second payload bay door for engaging the second door actuator assembly;

wherein the first and second payload bay door actuator systems further comprise door actuator assemblies for coordinating the opening and closing of the first and second payload bay doors with movement of the first and second pallets between the first and second positions.

15. The aircraft of claim 11 further comprising a first pallet drive mechanism mounted on an outboard side of the first pallet and a second pallet drive mechanism mounted on an outboard side of the second pallet.

16. The aircraft of claim 11, wherein each of the upper track assemblies comprises a first track disposed on the top surface of the respective one of the pallets proximate a forward end thereof and a second track disposed on the top surface of the respective one of the pallets proximate an aft end thereof and wherein each of the lower track assemblies comprises a first track disposed on a forward side interior surface of the payload bay and a second track disposed on an aft side interior surface of the payload bay.

17. A system comprising:

a first track assembly for connecting a top surface of a pallet supporting payload to an upper interior surface of a payload bay of an aircraft;

a second track assembly for connecting a side surface of the pallet to a side interior surface of the payload bay;

a pallet actuator system for selectively moving the pallet along the first and second track assemblies between a first position in which the pallet is fully extended from the payload bay and a second position in which the pallet is fully retracted into the payload bay;

a payload bay door for covering the payload bay;

a door actuator system for selectively opening and closing the payload bay door; and a door track assembly disposed on an interior surface of the payload bay door for engaging the door actuator system.

18. The system of claim 17, wherein the door actuator system further comprises a door actuator assembly for coordinating the opening and closing of the payload bay door with movement of the pallet between the first and second positions.

19. The system of claim 17 further comprising a rack suspended from the pallet, wherein the payload is disposed in the rack.

20. The system of claim 17, wherein the first track assembly comprises a first track disposed on the top surface of the pallet proximate a forward end thereof and a second track disposed on the top surface of the pallet proximate an aft end thereof and wherein the second track assembly comprises a first track disposed on a forward side interior surface of the payload bay and a second track disposed on an aft side interior surface of the payload bay.

* * * * *